United States Patent [19]

Kilburn

[11] Patent Number: 4,599,972
[45] Date of Patent: Jul. 15, 1986

[54] PORTABLE FREE STALL

[76] Inventor: Winston S. Kilburn, R.D. 1 - Burt Rd., P.O. Box 1183, Gansevoort, N.Y. 12831

[21] Appl. No.: 633,626

[22] Filed: Jul. 23, 1984

[51] Int. Cl.$^4$ .............................................. A01K 1/00
[52] U.S. Cl. ................................................. 119/27
[58] Field of Search ................... 119/14.03, 20, 27, 99

[56] References Cited

U.S. PATENT DOCUMENTS

| 600,433 | 3/1898 | Lindstam | 119/27 |
| 716,952 | 12/1902 | Snow | 119/27 |
| 3,077,861 | 2/1963 | Eide | 119/20 |

FOREIGN PATENT DOCUMENTS

| 563934 | 9/1958 | Canada | 119/27 |
| 695991 | 8/1953 | United Kingdom | 119/27 |

Primary Examiner—Robert P. Swiatek
Attorney, Agent, or Firm—Steele, Gould & Fried

[57] ABSTRACT

A portable free stall construction is disclosed which includes a rectangular base constructed of two long channels and two short channels arranged at right angles to form a rectangular configuration. A plurality of longitudinally spaced upright angles are secured along one of the longitudinal channels at spaced intervals to define a plurality of individual stalls. One leg of each upright angle is transversely oriented and provides a bolt down surface for partition planks to define and separate each stall. The other leg of each upright is longitudinally oriented and provides a bolt down surface for planks forming the front of the stall construction. A horizontal front angle member interconnects and ties together the tops of all of the upright angles. The left and right side of each stall is defined by a partition frame of solid steel construction which is bent as required to provide a forward, horizontal, top leg, a short, rearward, vertical leg and an angular leg connecting the forward and rearward legs. The horizontal top leg is secured to the horizontal angle member and the rearward leg is secured to the rearward long channel to provide a sturdy construction. The short channels are provided with centrally positioned, alignment openings to facilitate aligning two or more portable free stall units within a barn during installation procedures.

6 Claims, 6 Drawing Figures

_4,599,972_

PORTABLE FREE STALL

BACKGROUND OF THE INVENTION

1. Field of the Invention

The present invention relates generally to the field of free stalls for cattle, and more particularly, is directed to a portable type of free stall that may be placed within a building without requiring any permanent connection to the building structural members.

2. Description of the Prior Art

Conventional free stall constructions are generally fabricated of pipe or high strength tubing to provide individual beds or stalls of adequate size to allow full size cattle to lie down. Footings are provided at the bottom of the upright portions of the structural pipe members in well known manner and these footings together with the lower portions of the pipes are usually embedded directly in the concrete floor when the free stall barn is being constructed and the concrete floor is poured. Thus, the prior art free stalls became a permanent fixture within the barn and were incapable of being moved. Conventionally, a free stall barn comprises two rows of stalls facing toward the outside walls of the barn with a common walkway between the rows for passage by the cattle. Concrete curbs define the marginal edges of the walk and serve the common purposes of containing the manure within the walk and of providing a barrier to hold the bedding within the stalls wherein the cattle lie down.

The typical free stall barn construction most often utilizes an expensive inner wall design to make up the front of the stalls and also to serve as a barrier to keep the bedding from coming in contact with the outer siding of the barn. Because of the embedding of the free stall piping within the floor and because of the inner wall construction and design, a free stall barn is usually a single purpose building that cannot be easily or inexpensively renovated or which cannot be altered to any other type of use.

Frequently, the embedded portions of the pipe construction of the presently available free stalls have a relatively short life span. Quite often, the piping or high strength tubing becomes broken, corroded or otherwise deteriorated at floor level due to the inherent nature of the activities carried on within a free stall barn. Conventional welding practices to repair the severed or broken pipe can only be carried on with utmost care. Even when extreme care is exercized, there is still an extremely dangerous situation. Due to the necessary presence of considerable quantities of bedding all about the inside of a barn, the sparks from a welder's torch will always present a considerable fire hazard.

SUMMARY OF THE INVENTION

The present invention relates generally to an improved free stall construction, and more particularly, is directed to a portable free stall system that is capable of being readily moved within a barn or other building.

In accordance with the teachings of the present invention, a structural steel frame of interconnecting longitudinal and transverse channel member construction can be fabricated in usual manner, for example, by welding. The base of the portable free stall unit is designed of rectangular configuration of suitable dimensions to provide a predetermined number of full size stall units, for example, a three stall unit, a four stall unit or a five stall unit, as may be desired and as can be conveniently handled and moved by available power equipment. It is noteworthy that two or more portable free stall constructions can be placed in end to end juxtaposition to thereby accommodate any desired number of cattle.

At specific intervals along the longitudinal channel members, angle iron uprights are welded so that there is one such upright at each end of the unit and one for each stall partition. The angle leg parallel to the longitudinal channels provides a convenient bolt down surface for planks that make up a portion of the free stall front construction. The other leg of the upright angles, which is transversely oriented, provides a bolt down surface for transversely positioned planks which can be employed to separate and divide each stall unit from the next. Preferably, a horizontal angle is welded or otherwise joined at the tops of the vertical angles to tie the vertical supports together and to provide a good weld surface for each partition frame separation member. The horizontal angle is rearwardly open to receive the forward ends of the partition frame members.

In accordance with the teachings of the present invention, the portable free stalls may be fabricated at the site, in a shop, or at another location remote from the barn and then can be delivered to the barn and suitably positioned as desired and as dictated by the interior configuration of the building itself. By limiting the total number of stalls which are fabricated as a unit, conventional, easily available transporting apparatus can be employed to position the portable free stall constructions where desired. After the free stall frame members have been welded or otherwise joined together, suitable planking, which forms the front and side partitions of each stall, can be bolted to the steel framing after the frame members have been properly positioned. This also serves to reduce the total weight of a free stall unit that must be transported at one time.

Thus it is seen that the portable free stall construction of the present invention is completely self contained and self supporting and needs nothing more than adequate floor space provided within a barn or other building to provide a completely functional free stall construction. The structural members are not achored to the building in any way and therefore, the portable free stall units can be moved from building to building, they could be sold or could be otherwise relocated. Thus, should a farmer desire to change his system of operation, or should he go out of business or should the barn be converted to other use, the farmer or other interested person could sell the portable free stalls and thereby receive considerable sums of money upon disposal of the portable free stalls.

It is therefore an object of the present invention to provide an improved free stall construction of the type set forth.

It is another object of the present invention to provide a novel portable free stall that can be positioned in a building without being anchored to the building in any permanent fashion.

It is another object of the present invention to provide a novel portable free stall construction that is portable in nature and that is fabricated entirely of a free standing welded steel frame with provisions for bolting wooden planks or other dividers.

It is another object of the present invention to provide a novel portable free stall system that is capable of being easily moved into a predetermined location on an existing floor without requiring concrete curbs, inner walls or other permanent construction features.

It is another object of the present invention to provide a novel portable free stall system that is inexpensive in construction, portable in nature and trouble free when in use.

Other objects and a fuller understanding of the invention will be had by referring to the following description and claims of a preferred embodiment thereof, taken in conjunction with the accompanying drawings wherein like reference characters refer to similiar parts throughout the several views and in which:

BRIEF DESCRIPTION OF THE DRAWINGS

FIG. 6 is an enlarged, partial, elevational view, partially broken away, showing the interconnection between a partition frame and the front horizontal angle member.

DESCRIPTION OF THE PREFERRED EMBODIMENT OF THE INVENTION

Figure 1:
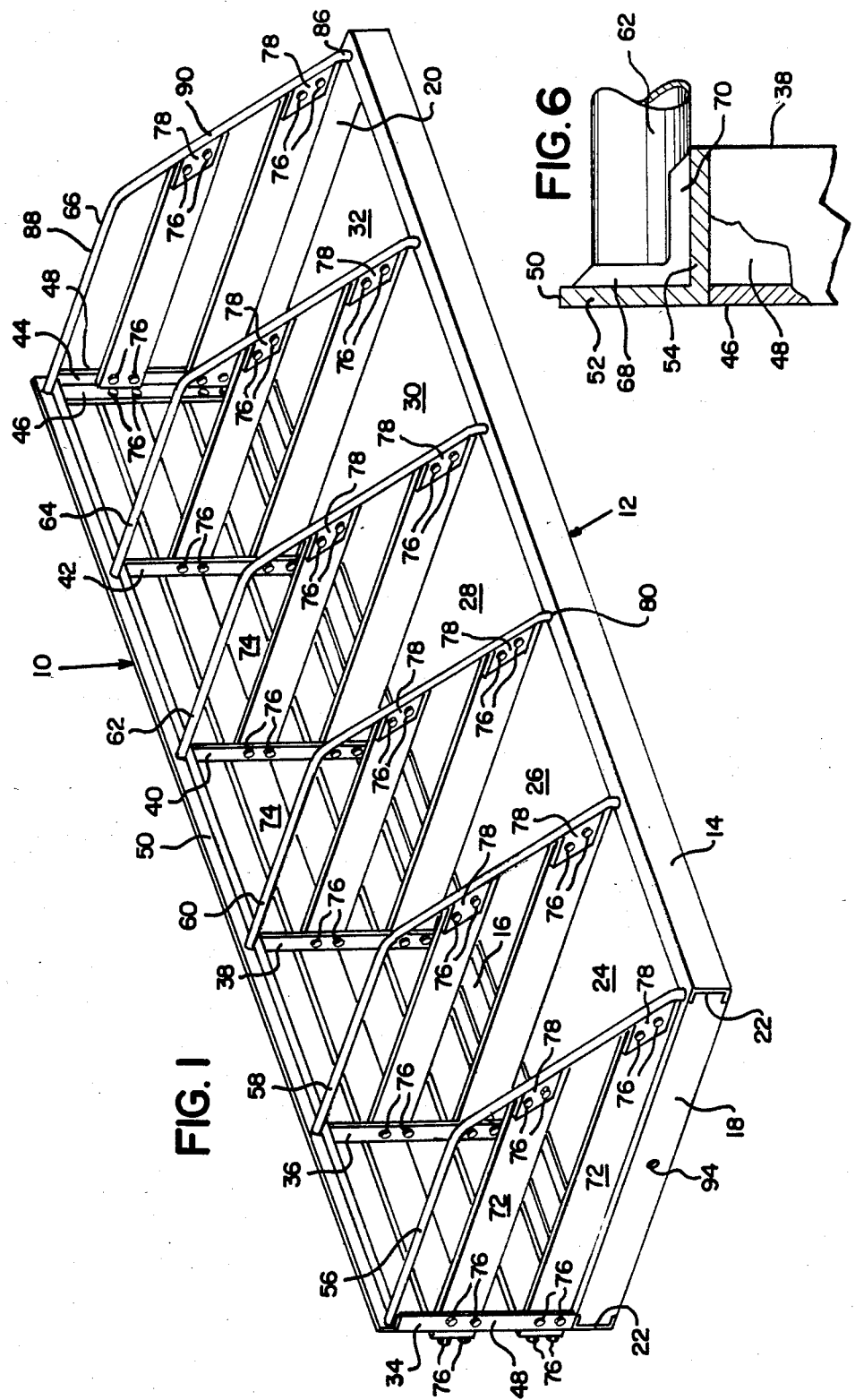
FIG. 1 is a perspective view of a portable free stall system constructed in accordance with the teachings of the present invention.

Although specific terms are used in the following description for the sake of clarity, these terms are intended to refer only to the particular structure of the invention selected for illustration in the drawings, and are not intended to define or limit the scope of the invention.

Figure 2:
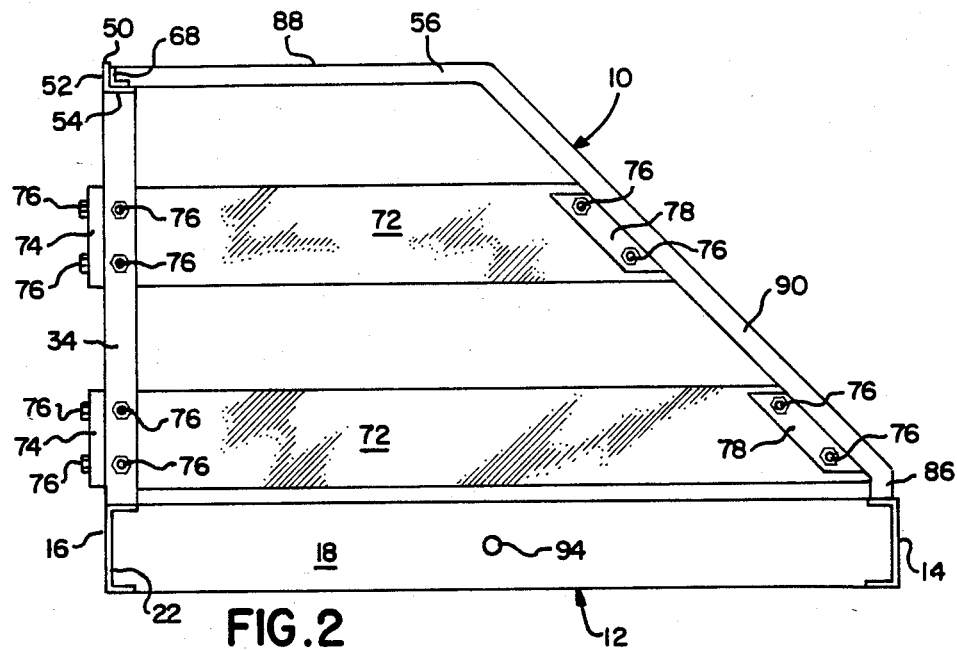
FIG. 2 is an elevational view of the free stall construction of FIG. 1.
Figure 3:
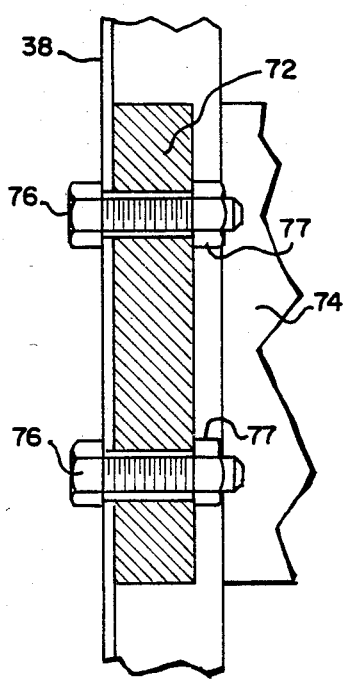
FIG. 3 is an enlarged, partial, cross-sectional view taken along line 3—3 on FIG. 2, looking in the direction of the arrows.
Figure 4:
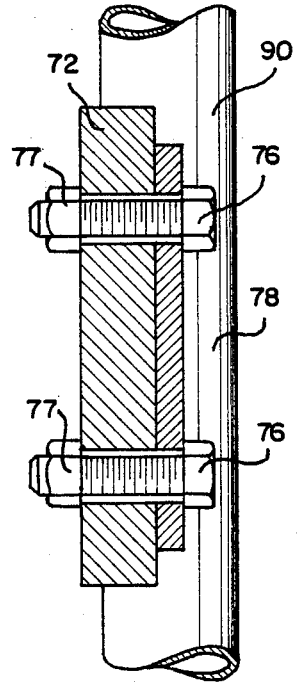
FIG. 4 is an enlarged, partial, cross-sectional view taken along line 4—4 on FIG. 2, looking in the direction of the arrows.
Figure 5:
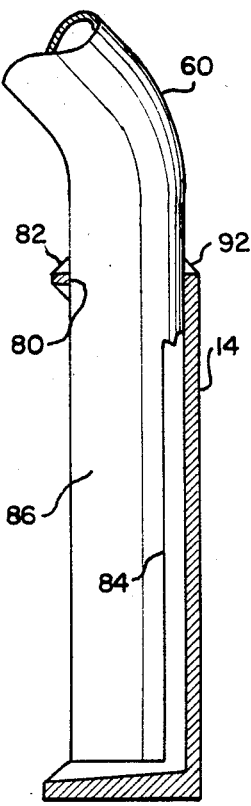
FIG. 5 is an enlarged, partial elevational view showing the interconnection between a partition frame and a base channel.

Referring now to the drawings, there is illustrated in FIGS. 1 and 2 a portable free stall generally designated 10 which is designed to be portable in nature and free standing in construction. In the illustrated embodiment, a five stall unit comprising longitudinally juxtaposed stalls 24, 26, 28, 30, 32 is illustrated. The stalls are of usual length and width sufficient to allow cattle to enter and lie down comfortably. While a five stall unit is illustrated, it will be appreciated that more or fewer stalls could be similiarly provided and still fall within the meaning and intent of this specification.

The free stall 10 comprises generally a base frame 12 which includes a pair of spaced, longitudinal channel-shaped members 14, 16 and a pair of spaced, transverse channel-shaped members 18, 20. The transverse channel members 18, 20 endwardly join the longitudinal members 14, 16 in respective welded connections 22 to form a rectangular, sturdy, structural steel base. The channel shaped base 12 provides a rugged support for the stall partition members and additionally, functions to retain the bedding (not shown) within the free stall without requiring the usual permanent concrete curb or other construction that must be affixed to the building structure.

Still referring to FIGS. 1 and 2, a plurality of forwardly positioned, longitudinally spaced upright angles 34, 36, 38, 40, 42, 44 are welded or otherwise securely affixed to the top flange of the front longitudinal channel 16 to thereby provide one upright angle at each lateral end of the free stall 10 and at each partition separating the individual stalls 24, 26, 28, 30, 32. The upright angles 34–44 are so positioned that one angle leg 48 aligns parallel with the left and right transversely positioned base channels 18, 20 and the other angle leg 46 aligns parallel with the longitudinally positioned base channels 14, 16. A structural angle 50 horizontally spans between the left upright angle 34 and the right upright angle 44 and is positioned with its horizontal leg 54 resting upon the tops of the upright angles 34–44 and with its vertical leg 52 extending upwardly therefrom. The horizontal leg 54 of the structural angle 50 is preferably welded at each interconnection with an upright angle 34–44 to provide a sturdy construction by tying all of the vertical angles together. Additionally, the top of the horizontal leg 54 forms a good weld surface to receive the front end of the individual partition frames as hereinafter more fully set forth. The vertical leg 52 of the horizontal angle member 50 defines the forward extent of the partition frames.

A plurality of partition frames 56, 58, 60, 62, 64, 66 are provided to define each stall 24, 26, 28, 30, 32 and are preferably formed of round or rectangular solid steel bar stock. The partition frames are bent as indicated to provide conventionally shaped stalls and each comprises a horizontal top portion 88, a short vertical bottom portion 86 and an interconnecting intermediate angular portion 90. As illustrated, in FIG. 6, the forward end of the horizontal top portion 88 of each partition frame 56–66 is welded or otherwise securely affixed to the horizontal leg 54 and the vertical leg 52 of the top structural angle 50 in a sturdy interconnection. Preferably, conventional welds 68, 70 can be employed for this purpose. The bottom vertical portions 86 of the partition frames 56–66 can be conveniently connected to the rearwardly positioned longitudinal channel 14 by cutting the top flange 82 at spaced intervals to provide rearward openings 80 of size and position to receive therein the respective bottom or vertical portion 86 of each partition frame. As illustrated, the parts may be secured together by employing vertical welds 84 and horizontal welds 92 or other suitable, known securing construction which may be suitable for the purpose.

As best seen in FIGS. 1 and 2, the front longitudinal legs 46 of the upright angles 34–44 can be utilized to provide convenient bolt down surfaces to secure the upper and lower forward horizontal planar barriers or planks 74 to form a closed front for the free stall 10. Bolts 76 and conventional nuts 77 can be employed for this purpose in the well known manner. The transversely positioned legs 48 of the upright angles 34–44 provide bolt down surfaces to receive and retain the upper and lower planar barriers or planks 72 which planks are utilized to define the sides of the individual stalls 24–32. Conventional bolts nuts 76,77 can be utilized as indicated. A plurality of upper and lower brackets 78 are welded or otherwise secured on the partition frame angular portions 90 to secure the rearward edges of the partition planks 72 by employing suitable bolts 76 and nuts 77 in the usual manner. Thus it is seen that an entirely portable, easily constructed and extremely sturdy portable free stall construction has been provided.

When it is desired to position a plurality of portable free stall constructions 10 in end to end juxtaposition, for example, to accommodate ten or more cattle, two or more five unit or other number of unit portable free stalls 10 can be positioned in side by side relationship. As illustrated in FIGS. 1 and 2, each transverse base channel 18, 20 can be provided with an alignment opening 94 positioned substantially in the base channel center to facilitate aligned multiple units within a barn (not shown).

Although the invention has been described with a certain degree of particularity, it is understood that the present disclosure has been made only by way of example and that numerous changes in the details of construction and the combination and arrangement of parts may be resorted to without departing from the spirit and scope of the invention. Thus the scope of the invention should not be limited by the foregoing specification, but rather only by the scope of the claims appended hereto.

What is claimed is:

1. A portable free stall construction of unitary construction comprising
   a free standing structural steel base frame, the base frame defining a polygon-shaped configuration and having longitudinally extending base members and transversely extending frame members,
      the said base members and frame members being affixed together to enable the base frame to be moved as a unit;
   a plurality of longitudinally spaced uprights secured to one of the longitudinally extending base members, said uprights subdividing the portable free stall into a plurality of individual stalls,
      said uprights comprising longitudinally aligned portions and tranversely aligned portions, the longitudinally and transversely aligned portions being provided with means to attach planar barriers thereto;
   a plurality of partition frames respectively extending rearwardly from said uprights to a transversely opposite portion of the base frame, each partition frame being secured respectively forwardly to an upright and respectively rearwardly to the transversely opposite portion of the base frame;
   a plurality of longitudinally aligned planar barriers secured to the longitudinally aligned portions of the uprights at the said means to attach to define the forward extent of the free stall; and
   a plurality of transversely aligned planar barriers secured to the transversely aligned portions of each of the uprights at the said means to attach and a portion of a partition frame,
   whereby a plurality of individual stalls having closed fronts and open backs can be provided.

2. The portable free stall construction of claim 1 wherein the base frame comprises a pair of front and rear, transversely spaced, longitudinally aligned, channel-shaped, structural steel members and a pair of left and right, longitudinally spaced, transversely aligned channel-shaped, structural steel members, the transversely aligned channel-shaped members being endwardly permanently interconnected to form a rectangular shape.

3. The free stall construction of claim 2 wherein the rear longitudinally aligned channel member comprises a web and upper and lower flanges horizontally extending from the web, the upper flange being provided with a plurality of longitudinally spaced openings to receive respectively portions of a partition frame therein.

4. A portable free stall construction comprising
   a free standing base frame, the base frame defining a polygon-shaped configuration and having longitudinally extending base members and transversely extending frame members;
   a plurality of longitudinally spaced uprights secured to one of the longitudinally extending base members, said uprights subdividing the portable free stall into a plurality of individuals stalls,
      the uprights comprising angle shaped structural members, each upright comprising a longitudinally aligned leg and a transversely aligned leg;
   a plurality of partition frames respectively extending rearwardly from said uprights to a transversely opposite portion of the base frame, each partition frame being secured respectively forwardly to an upright and respectively rearwardly to the transversely opposite portion of the base frame,
   a plurality of longitudinally aligned planar barriers secured to the uprights to define the forward extent of the free stall,
      the longitudinally aligned barriers being secured to the longitudinally aligned legs;
   a plurality of transversely aligned planar barriers secured between each of the uprights and a portion of a partition frame,
      the transversely aligned barriers being secured to the transversely aligned legs;
   a horizontal member extending between and being connected to the respective tops of the said uprights; and
      the top horizontal member being angle-shaped in cross section and comprising a vertical leg and a horizontal leg, the forward portions of the respective partition frames secured to the uprights being affixed to the horizontal member at the said horizontal and vertical legs thereof,
   whereby a plurality of individual stalls having closed fronts and open backs can be provided.

5. The portable free stall construction of claim 4 wherein at least some of the partition frames are bent to define a forward, horizontal portion, a rearward, vertical portion and a intermediate angular portion declining from the forward portion to the rearward portion.

6. The portable free stall construction of claim 5 including a bracket secured to the intermediate portions of the partition frames, each bracket being adapted to secure a forward part of a transversely aligned planar barrier.

* * * * *